May 7, 1935.  M. G. BLANK  2,000,575
SAFETY SHUTTER FOR MOTION PICTURE PROJECTORS
Filed March 28, 1933   2 Sheets-Sheet 2
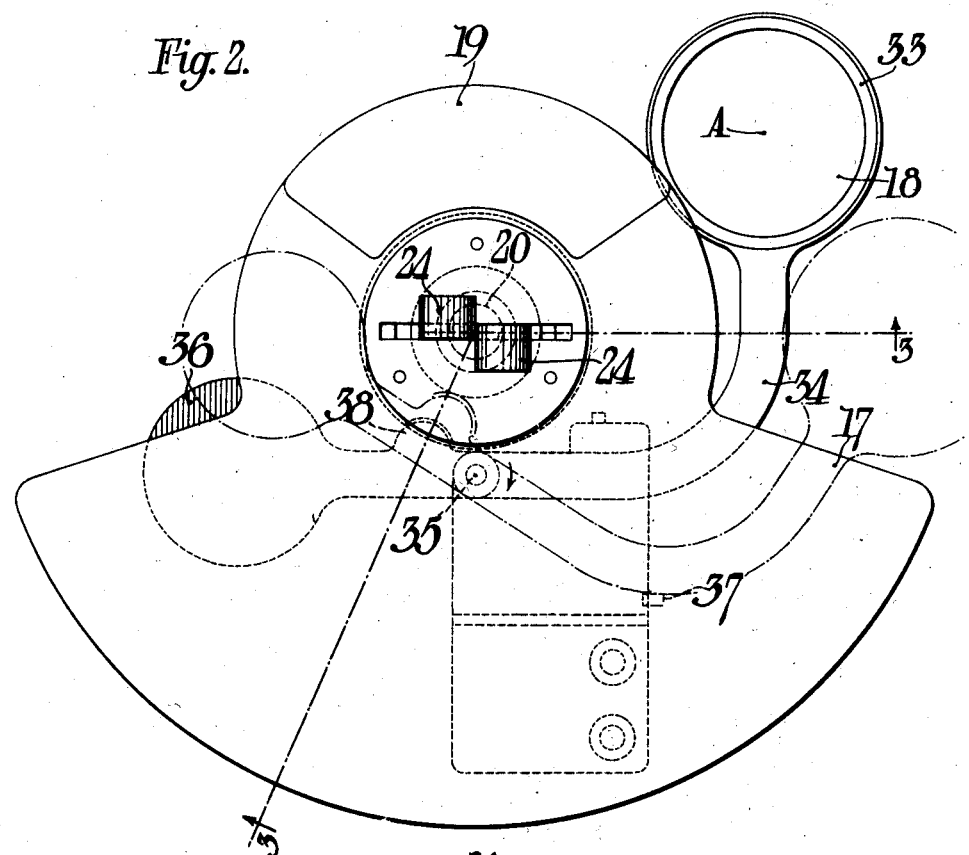
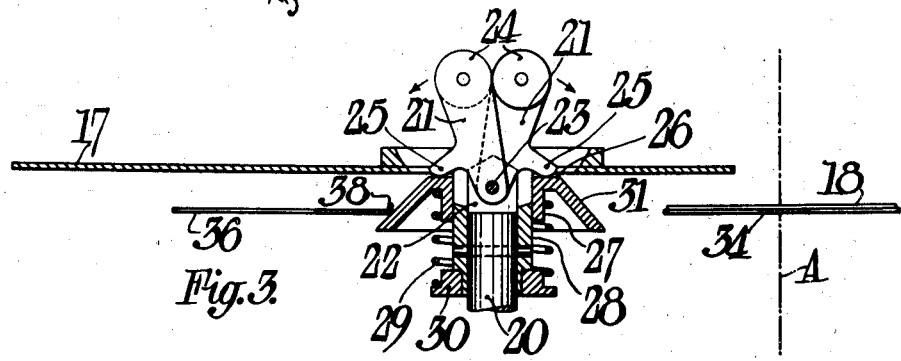
Inventor:
Maurice G. Blank, Patented May 7, 1935

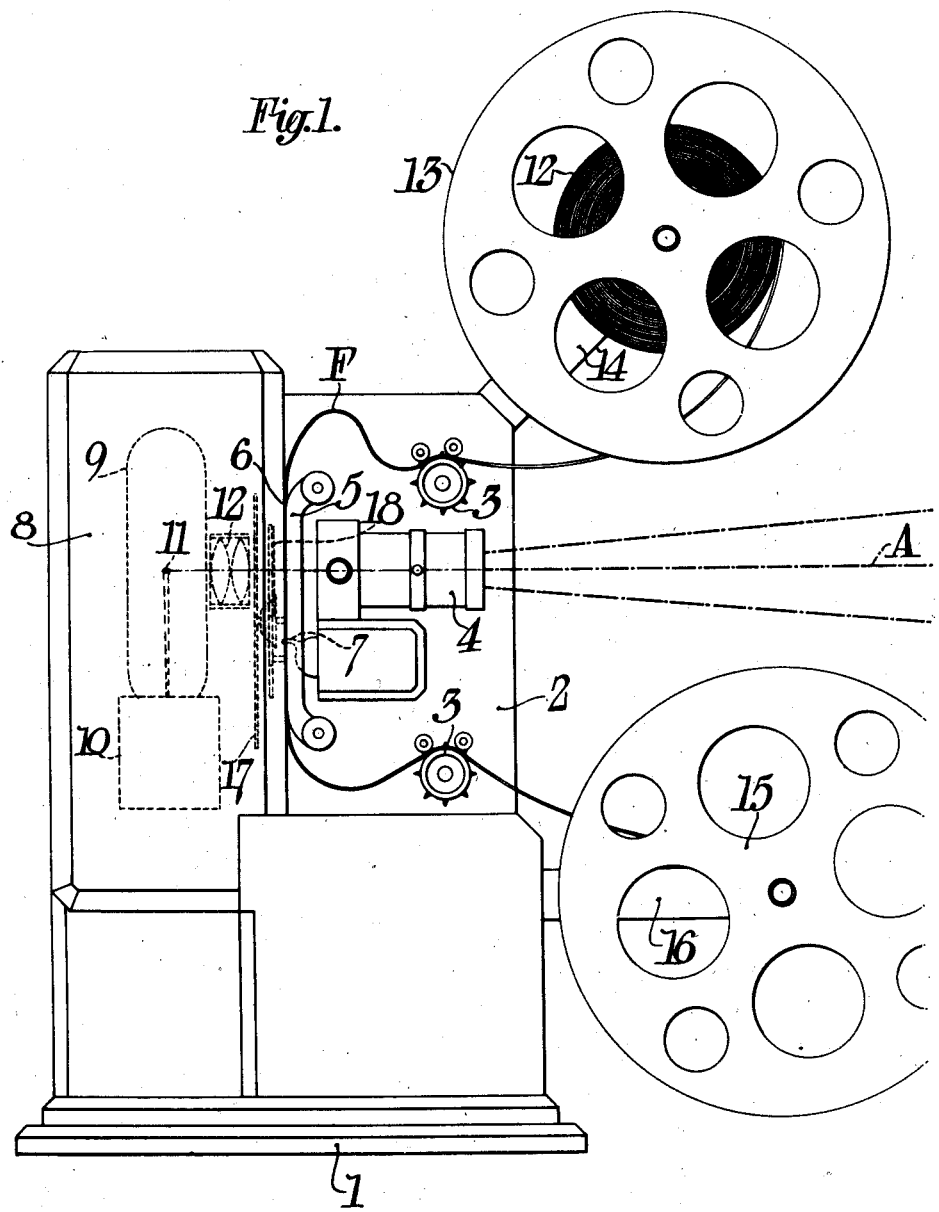

2,000,575

UNITED STATES PATENT OFFICE 2,000,575

SAFETY SHUTTER FOR MOTION PICTURE PROJECTORS

Maurice G. Blank, Rochester, N. Y., assignor to Eastman Kodak Company, Rochester, N. Y., a corporation of New York Application March 28, 1933, Serial No. 663,119

4 Claims. (Cl. 88—19.4)

This invention relates to the motion picture art and particularly to safety shutters for motion picture projectors. One object of my invention is to provide a motion picture projector with a safety shutter which is pivoted to the machine in such a manner that it normally lies out of the path of a light beam passing through the film but is forced into the path of the light beam as the speed of the machine is diminished beyond a predetermined speed. Another object of my invention is to provide a safety shutter which lies out of contact with the governor during the time the governor is rotating at a normal speed. Another object of my invention is to provide a safety shutter which is only contacted with by the governor when the speed of the governor is reduced beyond a predetermined amount. Another object of my invention is to provide a safety shutter which is counter-balanced in such a manner that it will normally move from its operative position lying in a light beam to an inoperative position in which it lies outside of the light beam, said shutter being counter-balanced in such a way that only a very slight force is required to move the shutter into its operative position and other objects will appear from the following specification, the novel features being particularly pointed out in the claims at the end thereof.

Coming now to the drawings wherein like reference characters denote like parts throughout;

Fig. 1 is a side elevation of a projector equipped with a safety shutter constructed in accordance with and embodying a preferred form of my invention;

Fig. 2 is a front elevation showing the shutter and safety shutter removed from the projector; and Fig. 3 is a section on line 3—3 of Fig. 2.

As indicated in Fig. 1 a typical form of projector may comprise a base 1 from which a body portion 2 extends upwardly, this body portion supporting the usual power driven sprockets 3, objective 4, gate 5, 6, pulldown claw 7 and lamp house 8. A lamp 9 is positioned in this lamp house, being seated in a socket 10 so that light rays from the filament 11 may be projected in a beam by means of the condenser system 12 through a film F lying in the gate 5, 6 so that an image carried by the film may be projected by the objective 4 on a screen in the usual manner along the axis A of the light beam. It is customary to have a film supply 12 on a reel 13 carried by the supporting arm 14 and the film is taken up upon a second reel 15 carried by the arm 16. It is understood that the mechanism for operating the movable parts are all included in the housing 2.

Coming now to my invention the projector is provided with the usual type of shutter 17 and in front of this shutter there is a safety shutter 18, both shutters being adapted to cross the axis A of the light beam.

Referring to Fig. 2 the usual projector shutter 17 may consist of a single blade, as shown in this figure, preferably counter-balanced at 19 and being adapted to interrupt the light beam three times for each picture frame although this is not essential to my invention. The shutter 17 is carried by a shaft 20 which is rotated by power and which shaft also carries a governor which consists of a pair of weighted levers 21 pivotally attached in a slot 22 in the end of the shaft upon a pin 23. The weights 24 of these levers are attached to the ends of the levers so that as the shaft 20 is rotated centrifugal force throws these levers in the direction shown by the arrows in Fig. 3.

Each lever is provided with an arm 25 adapted to press on a flat annular face 26 which is carried by a tubular slide 27 adapted to slide on the sleeve 28 pinned to the shaft 20. The flat face 26 is thrust towards the arms 25 by means of a spring 29 which also engages a collar 30 on the end of the tubular member 28.

There is an annular cam surface 31 extending away from the flat surface 26 and this cam surface moves axially of the shaft 20 in accordance with the position of the weighted arms 21.

The safety shutter 18 may consist of a medium for reducing heat rays such as a copper or other heat-dissipating wire screen, gold plated glass or mica, slotted metal or any other well known heat-retarding material. The materials above mentioned are adapted to pass certain light rays for projecting stills. It is obvious that if desired an opaque screen can be mounted in the frame 33 which holds whatever heat retarding material is desired on the end of an arm 34. This arm is pivotally mounted on the stud 35 and has a weighted end 36.

The weighted end 36 is so arranged that it does not quite counter-balance the weight of the safety shutter 18. Consequently, the screen normally tends to turn in the direction shown by the arrow about the pivot 35 until the arm 34 strikes the lug 37 which defines an inoperative position of the safety shutter 18. The axis of the light beam is indicated in Fig. 2 as being the point A.

In order to move the safety shutter 18 to its operative position, as shown in Fig. 2, in which it crosses the axis A of the light beam by turning upon the pivot 35, there is a cam surface 38 provided on the arm which normally lies in the path of the cam surface 31 of the governor. When these two cams contact, since the counter-balance 36 almost balances the safety shutter 18, very little force is necessary to swing the safety shutter into its operative position shown in Fig. 2.

Thus during the time that the projector is running at a normal speed for projecting pictures upon a screen the safety shutter 18 lies in its inoperative position shown in dot and dash lines in Fig. 2. However, as soon as the speed of the governor is reduced by the projector slowing up to a predetermined amount the cam surfaces 31 and 38 contact and the screen is cammed and turns on its pivot 35 until the safety shutter 18 reaches its operative position with respect to the light beam axis A shown in full lines in Fig. 2. This position will be retained as the projector continues to slow up and when the projector has been turned off the spring 29 continues to thrust the weighted members 21 towards each other and continues to cause the cam surfaces 31 and 38 to contact, as shown best in Fig. 3.

With a safety shutter made in accordance with the preferred embodiment of my invention described above it will be seen that there are a number of advantages which reduce the wear on the various parts which operate the safety shutter and which lead to quiet and efficient operation.

Since the cam surfaces 31 and 38 only contact when the projector is operating below a definite speed during the greater portion of time that the projector is working there is no connection between the safety shutter and its operating governor at all.

With the normal projection machine it only requires a very few seconds for the machine to reach its operating speed. Consequently, there is very little contact between the cam surfaces 31 and 38 which has the advantage of causing but little wear between these parts and also has the advantage of being quiet in operation and allowing the weighted levers 21 free play to govern the speed of the machine after it has reached the speed at which the safety shutter is released to move under its own weight from an operative position lying in the path of the light beam.

It is quite obvious that it is only when the speed of shaft 20 is considerably reduced from an operating speed that the governor weights move toward each other under the impulse of the spring 22. Since the sliding movement of the cam 31 takes place gradually as the weights 24 approach each other there is a complete lack of the usual shock or blow which may be caused by parts rapidly coming in contact with each other.

What I claim as new and desire to secure by Letters Patent of the United States is:

1. A safety shutter for motion picture projectors including in combination, a pivotally mounted safety shutter, a weight attached thereto to incompletely counter-balance the shutter whereby it normally moves on its pivot to an inoperative position, a governor mounted on a power driven shaft, said governor comprising weighted levers pivoted to said shaft, a cam disc mounted to slide axially of said shaft, a spring tending to move said cam disc in one direction said weighted levers being adapted to move said cam disc in an opposite direction whereby said cam may contact with said safety shutter only as the speed of the power driven shaft decreases and said cam disc may then be moved by the spring into position to engage and move the safety shutter.

2. In a motion picture projector, the combination with a projector shutter, a power driven shaft for moving said shutter, a safety shutter, a pivotal support for said safety shutter, a speed governor on said shutter shaft including an element adapted to move axially on said shaft, a centrifugal control for moving the said slidable element, said slidable element being adapted to cooperate with the safety shutter and through engagement therewith to move the safety shutter, said slidable element and safety shutter being so positioned relative to each other that contact between them will occur only at predetermined speeds of said shaft.

3. In a motion picture projector, the combination with a shutter, of a power driven shaft for supporting said shutter, a governor carried by said shaft including a beveled disc slidably supported relative to said shaft, a centrifugal control for said beveled disc, a safety shutter movably mounted on said projector and adapted to normally move to an inoperative position in which it is out of contact with the beveled disc, a part of said safety shutter lying in the path of movement of said beveled disc whereby said safety shutter may be moved to an operative position through movement of said beveled disc in which position the safety shutter contacts with said beveled disc.

4. In a motion picture projector, the combination with a shutter, of a power driven shaft for supporting said shutter, a governor carried by said shaft including a beveled disc slidably supported relative to said shaft, a centrifugal control for said beveled disc, a spring for moving the disc in one direction, a safety shutter movably mounted on said projector and adapted to normally move to an inoperative position in which it is out of contact with the beveled disc, a part of said safety shutter lying in the path of movement of said beveled disc, whereby said safety shutter may be moved to an operative position through movement of said beveled disc under the impulse of the spring, said spring retaining said beveled disc and safety shutter in contact.

MAURICE G. BLANK.